J. J. MORAN.
NUT LOCK.
APPLICATION FILED MAY 13, 1908.
909,637.
Patented Jan. 12, 1909.
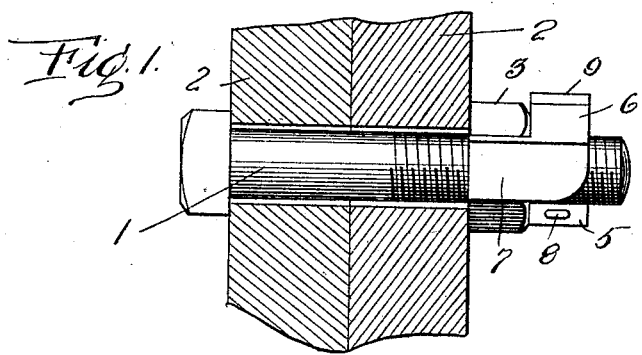
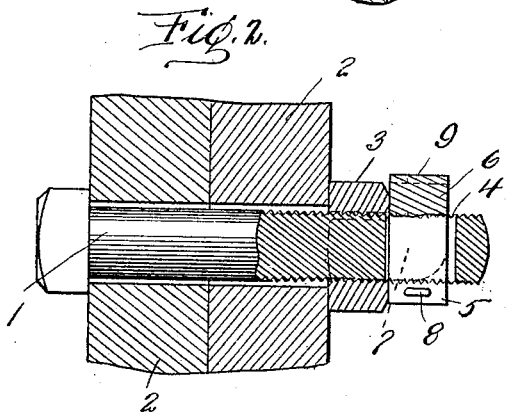
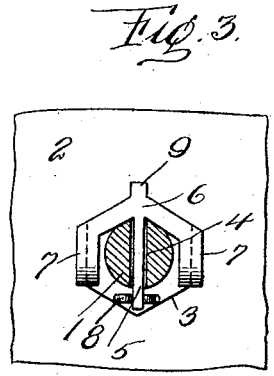
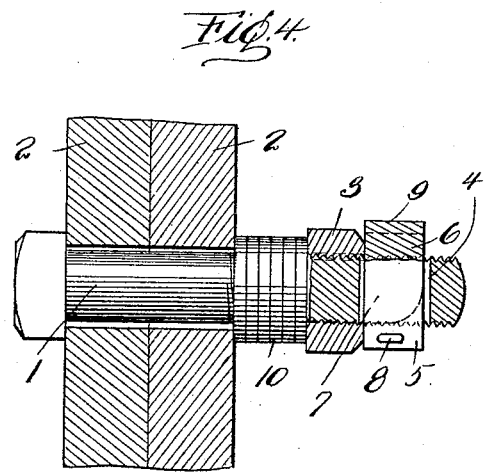
Witnesses
Samuel Payne
L. H. Butler
Inventor
James J. Moran
By H. C. Evert & Co.
Attorneys.

UNITED STATES PATENT OFFICE.

JAMES J. MORAN, OF McKEES ROCKS, PENNSYLVANIA.

NUT-LOCK.

No. 909,637.   Specification of Letters Patent.   Patented Jan. 12, 1909.

Application filed May 13, 1908. Serial No. 432,721.

*To all whom it may concern:*

Be it known that I, JAMES J. MORAN, citizen of the United States of America, residing at McKees Rocks, in the county of Allegheny and State of Pennsylvania, have invented certain new and useful Improvements in Nut-Locks, of which the following is a specification, reference being had therein to the accompanying drawing.

This invention relates to nut locks, and the primary object of my invention is the provision of positive and reliable means for locking a nut upon a bolt, whereby the vibrations of a bolt of the material through which the same passes will not loosen the nut mounted thereon.

A further object of my invention is to provide a simple, durable and inexpensive nut holding device that can be advantageously used in connection with rail joints and similar structures.

With the above and other objects in view which will readily appear as the invention is better understood, the same consists in the novel construction, combination and arrangement of parts to be presently described and then specifically pointed out in the appended claims.

Referring to the drawings forming a part of this specification, Figure 1 is a side elevation of my nut lock, Fig. 2 is a longitudinal sectional view of the same, Fig. 3 is an end view of a nut lock showing the bolt in cross section. Fig. 4 is a longitudinal sectional view of a nut lock illustrating the same used upon a long bolt.

In the accompanying drawings, 1 designates a bolt extending through two pieces of material 2. Upon the bolt 1 is screwed a nut 3 for locking the bolt 1 in the material 2.

The bolt 1 adjacent to the end thereof is provided with a longitudinal slot 4 and adapted to engage in said slot is a central depending shank 5, carried by a yoke 6 with the vertical arms thereof provided with rearward extensions 7 adapted to engage diametrically opposed faces of the nut 3. The length of the extensions 7 is substantially equal to that of the width of the face of the nut with which the extension engages. The extensions 7 are adapted to prevent said nut from rotating so long as said shank 5 engages in the slot 4. The width of the extensions 7 being less than the width of the vertical arms of the yoke. To retain the shank 5 in the slot 4 a cotter pin 8 or similar fastening means are employed.

The yoke 6 is adapted to embrace the upper half of the bolt 1 and to engage the outer end of the nut 3. In some instances the vertical arms of the yoke and the extensions 7 may not slip down upon the sides of the nut as easily as might be desired, consequently, I have provided the apex of the yoke 6 with a ridge 9 to receive a hammer blow for driving the nut retaining device in position.

Should the material through which the bolt passes be of less width than the material shown in Figs. 1 and 2 or the bolt 1 of a greater length than the bolt illustrated in said figures, washers 10 can be interposed between the material and the nut 3. This is best shown in Fig. 4.

My nut lock is made of strong and durable material and while in the drawings forming a part of this application there is illustrated a preferred form of construction embodying my invention, it is to be understood that the elements therein may be changed or varied without departing from the spirit of the invention.

Having now described my invention what I claim as new, is;—

1. In a nut lock, the combination with a bolt formed with an opening in its threaded end, and a nut mounted upon the opening, of a yoke mounted upon the bolt and against the outer face of the nut, said yoke embodying a shank extending through said opening and further provided with a pair of outwardly extending arms merging into a pair of vertical arms, said vertical arms provided with rearward extensions engaging opposite sides of the nut, said extensions of less width than the width of said vertical arms, and means engaging in the shank for connecting the yoke to the bolt, said yoke further provided with a ridge at the apex thereof.

2. In a nut lock, the combination with a bolt having a rectangular opening in the threaded end thereof, and a nut mounted upon the bolt, of a yoke mounted upon the bolt and against the outer face of the nut, said yoke having a rectangular shank extending through said opening and further provided with a pair of outwardly extending arms terminating in a pair of vertical arms, said vertical arms formed with rearward extensions engaging opposite sides of the nut, and means extending through the shank for connecting the yoke to the bolt.

3. In a nut lock, the combination with a bolt having a rectangular opening in the threaded end thereof, and a nut mounted upon the bolt, of a yoke mounted upon the bolt and against the outer face of the nut, said yoke having a rectangular shank extending through said opening and further provided with a pair of outwardly extending arms terminating in a pair of vertical arms, said vertical arms formed with rearward extensions engaging opposite sides of the nut, and means extending through the shank for connecting the yoke to the bolt, said yoke provided with a ridge at the top thereof.

In testimony whereof I affix my signature in the presence of two witnesses.

JAMES J. MORAN.

Witnesses:
MAX H. SROLOVITZ,
C. V. BROOKS.